H. KAAS.
PLANT FOR AUTOMATICALLY ASSORTING WOODEN MATERIALS AND THE LIKE ACCORDING TO THEIR SIZES.
APPLICATION FILED OCT. 30, 1917.
1,298,510.
Patented Mar. 25, 1919.
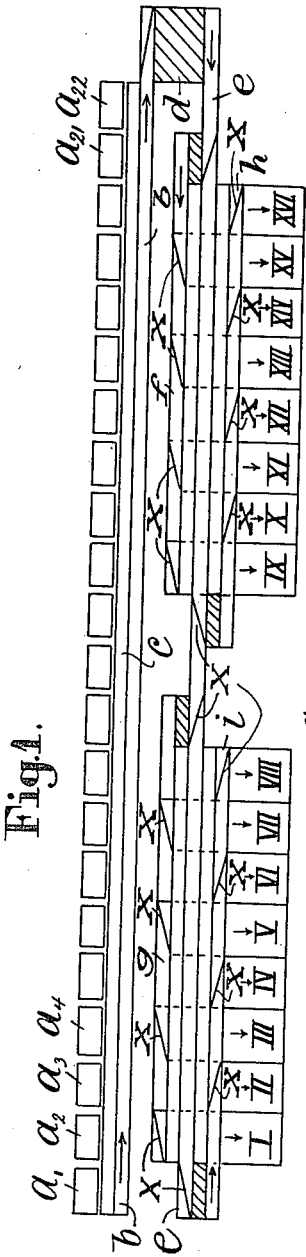
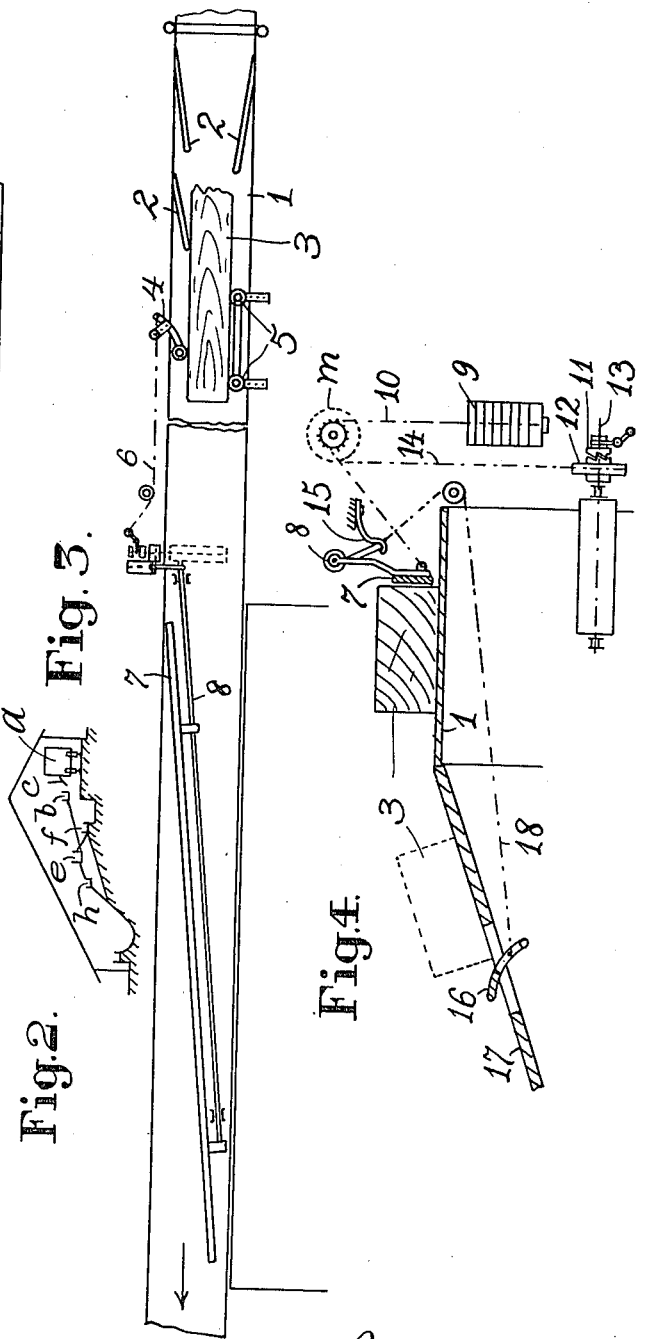
Inventor,
Harald Kaas,
By Hemworth Jr.
Atty

UNITED STATES PATENT OFFICE.

HARALD KAAS, OF CHRISTIANIA, NORWAY.

PLANT FOR AUTOMATICALLY ASSORTING WOODEN MATERIALS AND THE LIKE ACCORDING TO THEIR SIZES.

1,298,510.  Specification of Letters Patent.  Patented Mar. 25, 1919.

Application filed October 30, 1917. Serial No. 199,370.

*To all whom it may concern:*

Be it known that I, HARALD KAAS, a subject of the King of Norway, residing at Christiania, in the Kingdom of Norway, have invented certain new and useful Improvements in Plants for Automatically Assorting Wooden Materials and the like According to Their Sizes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in apparatus for automatically sorting wooden planks, deals, and like articles according to their size.

The present invention is particularly adapted for sorting materials according to the dimensions of their cross-section, but it can be easily modified to sort materials also according to their length.

Arrangements of this type have hitherto comprised devices which sorted a plank or deal automatically according to two of its dimensions, such as breadth and width, simultaneously.

According to the present invention, however, the material such as planks, or the like, is all completely sorted according to one dimension and is then subjected to a second series of devices for sorting it according to the second dimension.

Moreover, in the previous automatic sorting methods, the plank or deal itself had to operate its displacement, in other words, energy had to be imparted to the plank by the conveyer to cause it to operate directly the devices which turned it off said conveyer.

Now according to the present invention, the planks or deals only operate the sorting mechanism acting upon them indirectly, so that the conveyer only has the work of moving the deals or planks along.

Figure 1 illustrates diagrammatically an assorting plant adapted for the lumber yard of a saw mill or the like.

Fig. 2 is a cross section of the plant illustrated on Fig. 1.

Fig. 3 is an enlarged plan view of a conveyer with an assorting and scraping mechanism.

Fig. 4 is a cross section of the same.

On Fig. 1 $a^{1-22}$ are a number of railway carriages containing a mixed load of planks with different dimensions for instance four different thicknesses and four different breadths, that is in all sixteen different dimensions, which are to be assorted and delivered to a corresponding number of assembling places. This assortment and delivery in accordance with the present invention take place in the following manner:

In parallel to the row of railway carriage $a^{1-22}$ is placed a conveyer $b$ onto which the wooden materials are loaded from the carriages by means of an incline $c$. From one end of the conveyer $b$ another conveyer $d$ conveniently in the form of a sloping plane carries the materials to the conveyer $e$, which is provided with three thickness assorters and four scrapers.

The three thickness assorters now successively push away the four different thicknesses, each of the assorters being adjusted for one of the three thickest dimensions while the material of the smallest dimension slips through all assorting apparatuses, until it arrives at a stationary scraper. The three largest dimension each actuate a thickness assorter, which releases a scraper, so that the latter is put into operating position, pushing the plank in question off the conveyer. All the scrapers are indicated with $x$ on the diagrammatical plan Fig. 1.

The four thicknesses thus separated are now carried by means of an incline, indicated by shadowed lines at each scraper, to the four conveyers $f, g, h, i$. On each of the four conveyers are placed corresponding scrapers for assorting the different breadths, that is, each of the conveyers $f, g, h, i$ is provided with three assorting mechanisms and four scrapers. The direction of movement of the conveyers is indicated by arrows. From the said scrapers the assorted planks are carried by means of inclines or conical conveyers to boxes indicated with numerals I—XVI, from which they are distributed to the different places of assembling or working.

In Figs. 3 and 4, 1 is a belt conveyer moving in the direction indicated by the arrow. 2 indicate springs or the like, which serve to place a plank 3 in position, before it enters the assorting apparatus 4, where it is further steadied by means of rollers 5. In front of the assorting apparatus is further placed a stopper, which prevents more than one plank at the time from entering the apparatus.

The assorting apparatus 4, which is adjustable with regard to rollers 5, so as to be actuated by different dimensions, consists of a lever, the free end of which is actuated by any plank of a determined size, so that it performs a certain swinging movement. Said movement is transmitted by means of wire or rod 6 to a releasing mechanism for the scraper 7, which is thereby actuated so as to push the plank in question off the conveyor.

In order to obtain a suitable safe working assorter it may be necessary to use an electrical contact device releasing the scraper, the lever 4 being then adapted to close an electric circuit actuating a motor or the like for moving the scraper. The scraper 7 may conveniently consist of a rod or ruler which is placed at an angle across the conveyer. The scraper may however also consist of rollers or the like.

A scraper of this kind gives a great advantage over the known scrapers, which generally consist of arms or levers which move perpendicularly across the conveyer. The angular scraper according to the present construction will always perform a steady pushing action and will push off the planks without any shock, even if the plank adheres to the conveying belt. The scraper is pivoted on an axle 8 or on a number of trunnions. A weight 9 which is connected to the scraper by means of wire 10 tends to swing the scraper out of its active position.

The lever 4 when acted upon by a plank or the like actuates a coupling mechanism 11 connecting the pulley 12 with the continuously rotating driving shaft 13. The pulley 12 is connected by means of wire 14 with a pulley $m$, the shaft of which also carries the pulley for wire 10 to which the weight 9 is fastened. When the coupling 11 engages pulley 12, the weight 9 will be lifted and at the same time scraper 7 will fall back into its operative position, where it is maintained by means of spring catch 15. This catch is again released by means of lever 16, which is actuated by the plank 3 after the same has been pushed off the conveyer 1 and slides down the incline 17. Said lever 16 is connected with catch 15 by means of a wire 18 or the like.

It is obvious that the general arrangement specified above as well as the details of the system may be modified in different ways without getting outside the scope of the invention.

Claims:

1. In an apparatus for automatically assorting planks and the like according to their size, a conveyer for carrying the planks, means located at suitable intervals along the conveyer adapted to push the planks from the conveyer, operating devices for said means, and mechanism actuated by the movement of the planks for indirectly controlling the operating devices to move said planks from the conveyer.

2. In an apparatus of the character described, mechanism whereby the planks are first sorted according to one dimension, and mechanism whereby the planks are subsequently assorted according to another dimension.

3. In an apparatus of the character described, a conveyer for carrying planks, a scraper adapted to remove a plank from the conveyer, mechanism for moving the scrapers into and out of operative position, and an electric contact operated by the movement of the plank whereby said mechanism is operated to move the scraper out of operative position.

4. In a plant for automatical assortment transport and delivery of wooden materials in accordance with their size the arrangement along a conveyer of dimension indicators in the form of electric contacts adapted to be actuated by successively decreasing dimensions, said contacts serving to close an electric circuit feeding a motor or the like for bringing a scraping mechanism in operative position.

5. In a plant for automatical assortment transport and delivery of wooden materials in accordance with their size one or more conveyers for the materials to be assorted— scrapers located at suitable intervals along said conveyer or conveyers for pushing the materials off the same said scrapers comprising a long rod or ruler placed at an angle across the conveyer and maintained in this position during the operation of pushing off a plank.

6. In a plant for automatical assortment transport and delivery of wooden materials in accordance with their size one or more conveyers for the materials to be assorted— scrapers located at suitable intervals along said conveyer or conveyers for pushing the materials off the same said scrapers comprising a long rod or ruler placed at an angle across the conveyer and maintained in this position during the operation of pushing off a plank a spring, weight or the like tending to pull the scraper out of its operative position and a spring catch keeping it in the said position and being released by means of a lever or the like actuated by the plank when being pushed off the conveyer.

7. In a plant for automatical assortment transport and delivery of wooden materials in accordance with their size one or more conveyers for the materials to be assorted—scrapers located at suitable intervals along said conveyer or conveyers for pushing the materials off the same said scrapers comprising a long rod or ruler placed at an angle across the conveyer and adapted to swing into and out of operative position on an axle parallel to the plane of the conveyer.

In testimony that I claim the foregoing as my invention, I have signed my name in presence of two subscribing witnesses.

HARALD KAAS.

Witnesses.
C. VORMAN,
M. W. KAHRE.